United States Patent [19]

Takai

[11] Patent Number: 4,895,781

[45] Date of Patent: Jan. 23, 1990

[54] LAYERED ELECTROPHOTOGRAPHIC PHOTOSENSITIVE MEMBER CONTAINING SUBSTITUTED POLYCYCLO TRISAZO COMPOUNDS

[75] Inventor: Hideyuki Takai, Yokohama, Japan

[73] Assignee: Canon Kabushiki Kaisha, Tokyo, Japan

[21] Appl. No.: 326,735

[22] Filed: Mar. 21, 1989

[30] Foreign Application Priority Data

Mar. 23, 1988 [JP] Japan ................................. 63-67281

[51] Int. Cl.$^4$ .......................... G03G 5/14; G03G 5/06
[52] U.S. Cl. ....................................... 430/58; 430/72; 430/76; 430/79

[58] Field of Search .................. 430/72, 76, 58, 79

[56] References Cited

U.S. PATENT DOCUMENTS 4,436,800  3/1984  Ohta ................................. 430/75 X Primary Examiner—J. David Welsh
Attorney, Agent, or Firm—Fitzpatrick, Cella, Harper & Scinto

[57] ABSTRACT

An electrophotographic photosensitive member is disclosed which has a photosensitive layer on an electroconductive support. The photosensitive layer contains a trisazo pigment having the specific structural formula.

13 Claims, No Drawings

LAYERED ELECTROPHOTOGRAPHIC PHOTOSENSITIVE MEMBER CONTAINING SUBSTITUTED POLYCYCLO TRISAZO COMPOUNDS

BACKGROUND OF THE INVENTION

1. Field of the Invention

This invention relates to an electrophotographic photosensitive member, particularly to an electrophotographic photosensitive member containing a trisazo pigment having a specific molecular structure in the photosensitive layer.

2. Related Background Art

In the prior art, as the electrophotographic photosensitive member using an inorganic photoconductive substance, those by use of selenium, cadmium sulfide, zinc oxide, etc. have been widely known.

On the other hand, as the electrophotographic photosensitive member using an organic photoconductive substance, those by use of a photoconductive polymer as represented by poly-N-vinylcarbazole or a low molecular weight organic photoconductive substance such as 2,5-bis(p-diethylaminophenyl)-1,3,4-oxadiazole, and further combinations of such organic photoconductive substance with various dyes and pigments have been known.

The electrophotographic photosensitive member using an organic photoconductive substance has advantages that it has good film formig property, can be produced by coating, is high in productivity and capable of providing inexpensive photosensitive members. Also, it has the advantage that color sensitivity can be freely controlled by selection of the dye or pigment to be used, and therefore broad investigations have been done up to date about such photosensitive members. Particularly recently, by development of a function separation type photosensitive member having a charge generation layer of an organic photoconductive pigment and a charge transport layer comprising a photoconductive polymer or a low molecular weight photoconductive substance as described above laminated, sensitivity and durability which have been the drawbacks of the organic electrophotographic photosensitive member of the prior art have been remarkably improved to enable practical application thereof possible.

Further, in recent years, with propagation of laser beam printers, it has been abundantly done to develop an electrophotographic photosensitive member having sensitivity to the long wavelength region around 800 nm, and further an electrophotographic photosensitive member capable of obtaining uniform sensitivity over 760 nm to 800 nm in view of the oscillating width in the oscillation wavelength region of the laser, and as the organic photoconductive azo pigment to be used in such photosensitive member, for example, biphenylamine type disazo pigments disclosed in Japanese Laid-open Patent Publication No. 61-43662 and triphenylamine type trisazo pigments disclosed in Japanese Laid-open Patent Publication No. 53-132347. etc. have been known. The electrophotographic photosensitive members using these azo pigments, while having excellent sensitivity, are on the other hand not sufficient in charging ability, dark decay, potential stability during repeated uses.

Further, the benzanthrone type disazo pigments disclosed in Japanese Laid-open Patent Publications Nos. 59-31962, 61-219048 and 62-127845 have excellent sensitivity and potential stability, but were still insufficient in aspect of flatness of sensitivity in the laser oscillation wavelength region.

SUMMARY OF THE INVENTION

An object of the present invention is to provide a electrophotographic photosensitive member having excellent sensitivity and potential stability in successive uses.

Another object of the present invention is to provide an electrophotographic photosensitive member having high sensitivity in long wavelength region and the characteristics of high sensitivity uniform over 760 nm to 800 nm.

More specifically, the present invention provides an electrophotographic photosensitive member having a photosensitive layer on an electroconductive support, wherein said photosensitive layer contains a trisazo pigment represented by the formula (1) shown below:

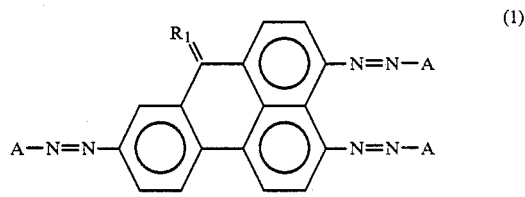

(1)

wherein $R_1$ represents oxygen atom or

and A represents a coupler residue having phenolic hydroxyl group.

DETAILED DESCRIPTION OF THE PREFERRED EMBODIMENT

The present inventors have found as the result of investigations that a trisazo pigment represented by the formula (1) having the benzanthrone structure or the dicyanobenzanthrone structure as the center skelton, and having three azo groups introduced into the center skelton can exhibit excellent electrophotographic characteristics to accomplish the object as mentioned above.

Specific examples of A include the residues represented by the following formulae (2) to (6).

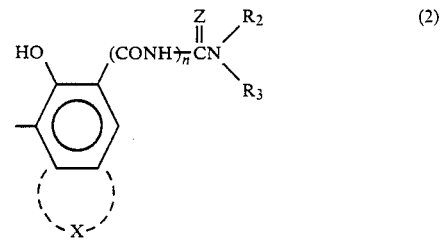

(2)

In the formula, X represents a residue necessary for forming a polycyclic aromatic ring or a heterocyclic ring such as naphthalene ring, anthracene ring, carbazole ring, benzcarbazole ring, dibenzcarbazole ring, dibenzofuran ring, dibenzonaphthofuran ring, diphnylenesulfite ring, fluorenone ring, etc. by fusion with benzene ring.

Among them, the ring to which X is bonded should be more preferably made naphthalene ring, anthracene ring, carbazole ring, benzcarbazole ring.

$R_2$ and $R_3$ each represent hydrogen atom, alkyl, aryl, aralkyl, heterocyclic group, or a cyclic amino group containing the nitrogen atom to which $R_2$ and $R_3$ are bonded within the ring.

Specifically, the alkyl group may include methyl, ethyl, propyl, butyl, etc.; the aralkyl group benzyl, phenethyl, naphthylmethyl, etc.; the aryl group phenyl, diphenyl, naphthyl, anthryl, etc.; the heterocyclic group carbazole, dibenzofuran, benzimidazolone, benzthiazole, thiazole, pyridine, etc.

Z represents hydrogen atom or sulfur atom.

n represents an integer of 0 or 1.

Formula:

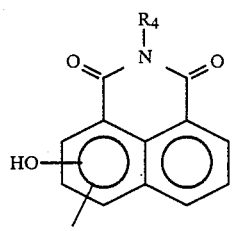
(3)

In the formula, $R_4$ represents hydrogen atom, alkyl, aryl or aralkyl goup which may have substituent. Specific examples of $R_4$ may include the same examples as mentioned above for $R_2$, $R_3$.

Further, examples of the substituent on the alkyl, aryl, aralkyl, heterocyclic groups represented by $R_2$–$R_4$ in general formulas (2) and (3) may include halogen atoms such as fluorine, chlorine, iodine, bromine atoms, alkyl groups such as methyl, ethyl, propyl, isopropyl, butyl, etc., alkoxy groups such as methoxy, ethoxy, propoxy, etc., phenoxy, nitro group, cyano group, substituted amino groups such as dimethylamino, dibenzylamino, diphenylamino, morpholino, piperidono, pyrrolidino, etc.

Formula:

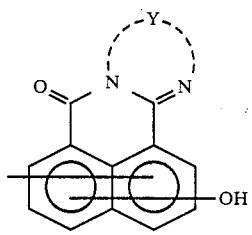
(4)

In the formula, Y represents a divalent group of aromatic hydrocarbon or a divalent group of heterocyclic group containing nitrogen atom in the ring, and examples of the divalent group of aromatic hydrocarbon may include divalent groups of monocyclic aromatic hydrocarbon such as o-phenylene, divalent groups of fused polycyclic aromatic hydrocarbon such as o-naphthylene, perinaphthylene, 1,2-anthrylene, 9,10-phenanthrylene, etc., and examples of the divalent group of heterocyclic ring containing nitrogen atom in the ring may include 3,4-pyrazolediyl group, 2,3-puridinediyl group, 4,5-pyrimidinediyl group, 6,7-indazolediyl group, 6,7-quinolinediyl group, etc.

Formula:

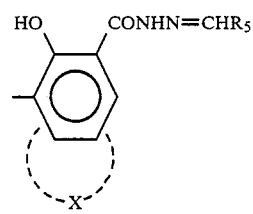
(5)

In the formula, $R_5$ represents aryl or heterocyclic group which may have substituent, specifically aryl groups such as phenyl, naphthyl, anthryl, pyrenyl, and heterocyclic groups such as pyridyl, thienyl, furyl, carbazolyl, etc.

Further, as the substituent on the aryl group, heterocyclic group, there may be included halogen atoms such as fluorine, chlorine, iodine, bromine atoms, alkyl groups such as methyl, propyl, isopropyl, butyl, etc., alkoxy groups such as methoxy, ethoxy, propoxy, etc., phenoxy, nitro group, cyao group substituted amino groups such as dimethylamino, dibenzylamino, diphenylamino, morpholine, piperidino, pyrrolidino, etc.

X is the same as X in the above formula (2).

Formula:

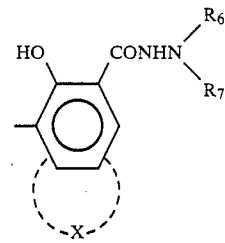
(6)

In the formula, $R_6$ and $R_7$ each represent alkyl, aralkyl, aryl or heterocyclic group which may have substituent, specifically alkyl group such as methyl, ethyl, propyl, butyl, etc.; aralkyl group such as benzyl, phenethyl, naphthylmethyl, etc.; aryl group such as phenyl, diphenyl, naphthl, anthryl, etc.; heterocyclic group such as carbazolyl, thienyl, pyridyl, furyl, etc. Further as the substituent on alkyl group, aralkyl group, aryl group, heterocyclic group, there may be included halogen atoms such as fluorine, chlorine, iodine, bromine atoms, etc.; alkyl group such as methyl, ethyl, propyl, isopropyl, butyl, etc.; alkoxy groups such as methoxy, ethoxy, propoxy, etc.; nitro group, cyano group, substituted amino groups such as dimethylamino, dibenzylamino, diphenylamino, morpholino, piperidino, pyrrolidino, etc.

X is the same as X in the above formula (2).

In the following, specific examples of the trisazo pigments represented by the formula (1) of the present invention are enumerated.

Basic Structure 1

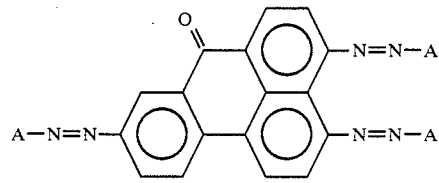

Exemplary Pigment (1)

-continued
A: 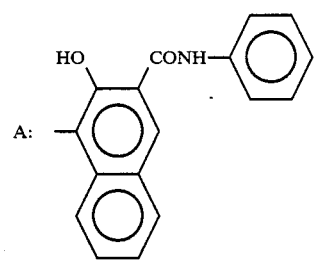
Exemplary Pigment (2)
A: 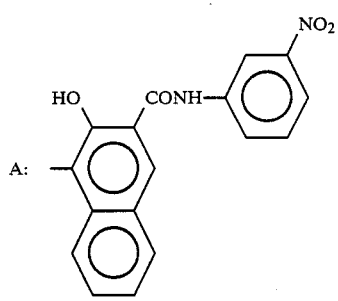
Exemplary Pigment (3)
A: 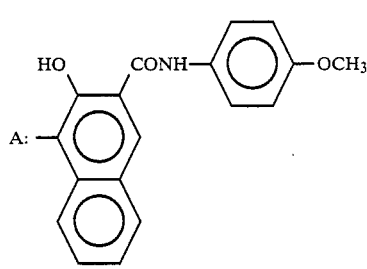
Exemplary Pigment (4)
A: 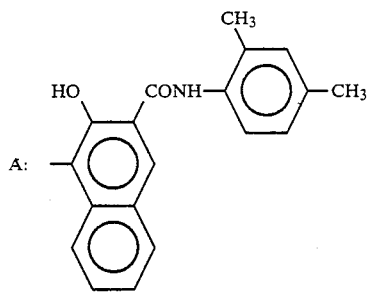
Exemplary Pigment (5)
A: 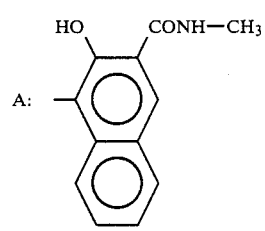
Exemplary Pigment (6)
-continued
A: 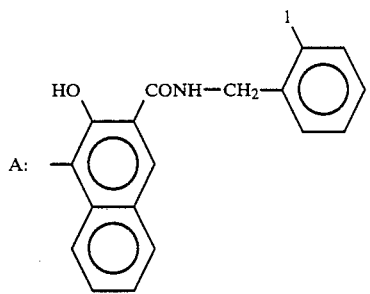
Exemplary Pigment (7)
A: 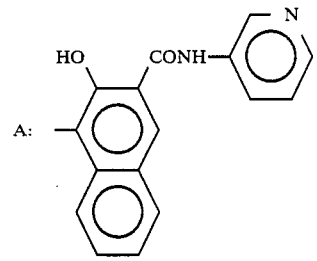
Exemplary Pigment (8)
A: 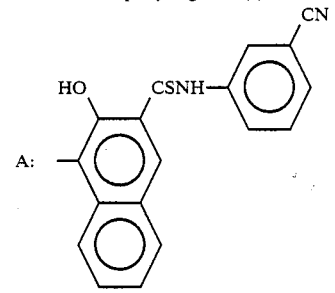
Exemplary pigment (9)
A: 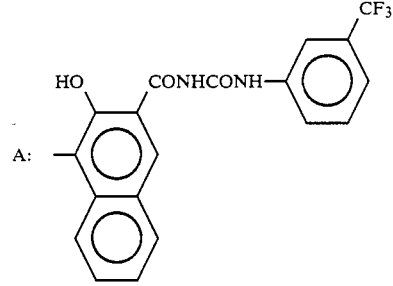
Exemplary pigment (10)
A: 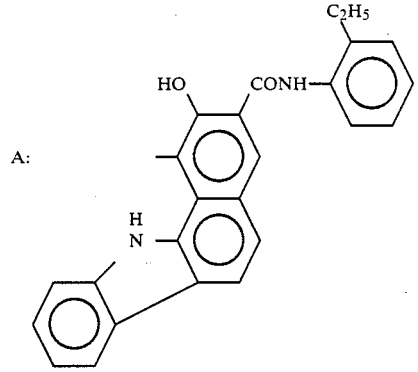
Exemplary pigment (11)

A: 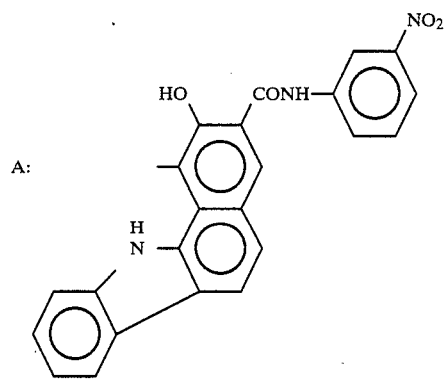
Exemplary pigment (12)
A: 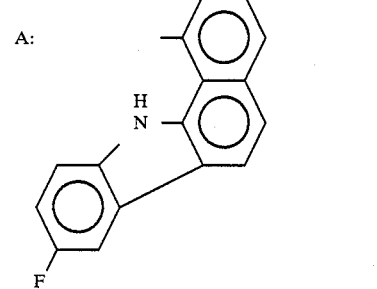
Exemplary pigment (13)
A: 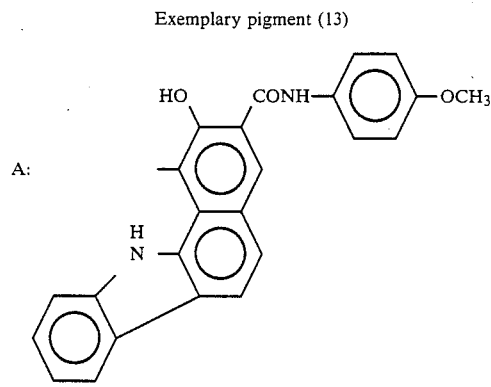
Exemplary pigment (14)
A: 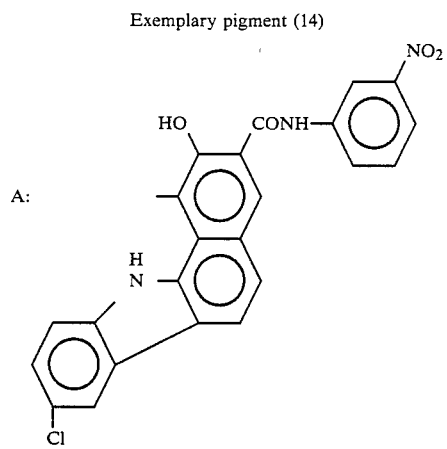
Exemplary pigment (15)
A: 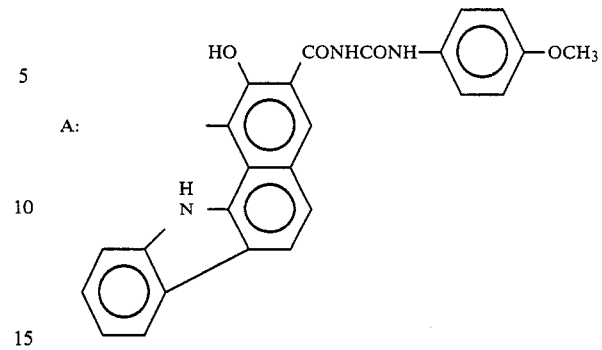
Exemplary pigment (16)
A: 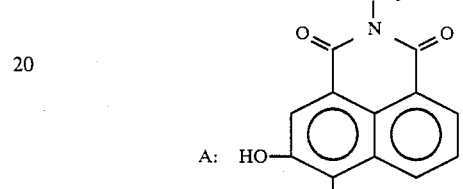
Exemplary pigment (17)
A: 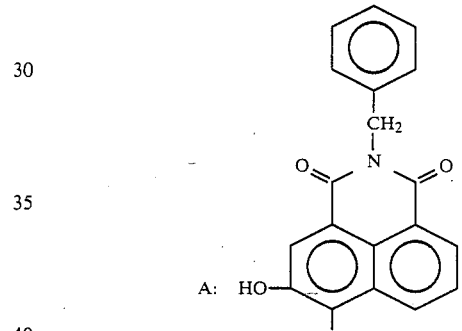
Exemplary pigment (18)
A: 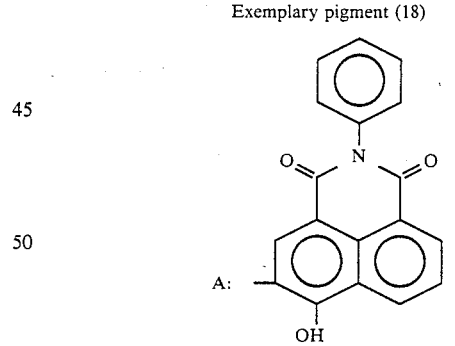
Exemplary pigment (19)

-continued
Exemplary pigment (20)
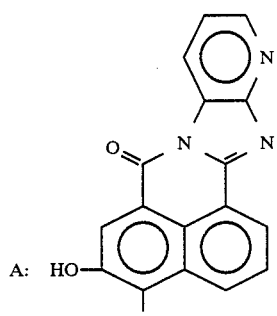
Exemplary pigment (21)
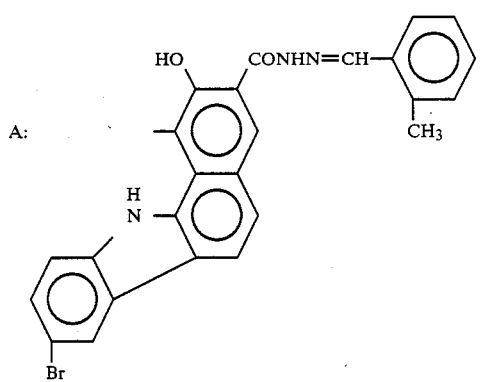
Exemplary pigment (22)
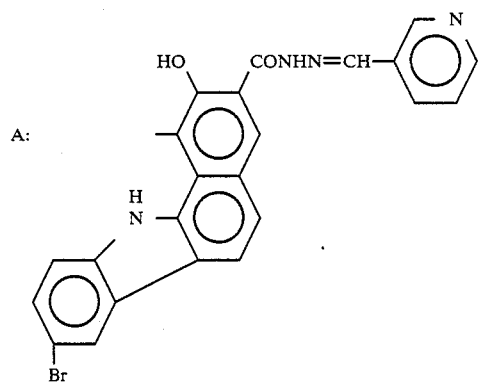
Exemplary pigment (23)
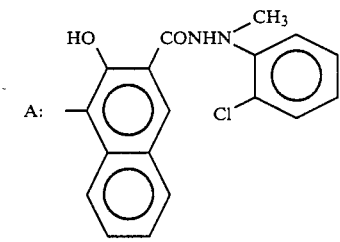
Exemplary pigment (24)
-continued
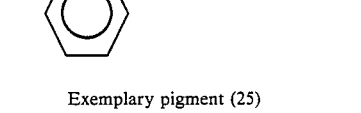
Exemplary pigment (25)
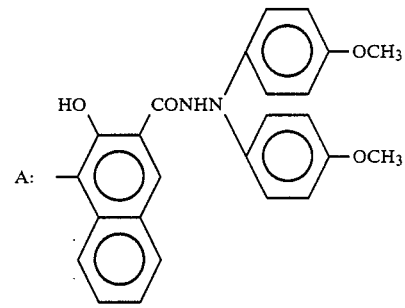
Exemplary pigment (26)
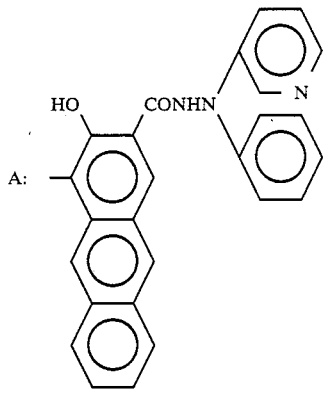
Basic structure 2
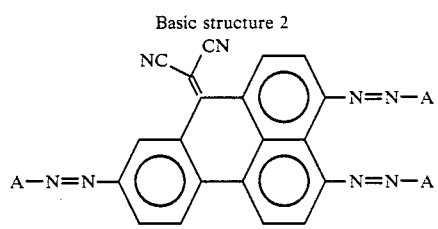
Exemplary pigment (27)
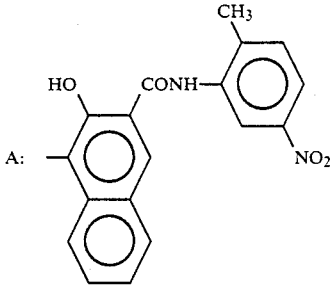
Exemplary pigment (28)

-continued
A: 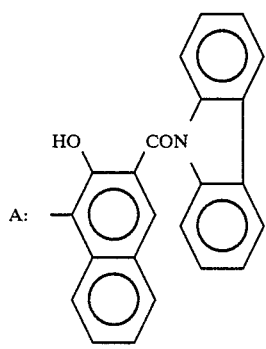
Exemplary pigment (29)
A: 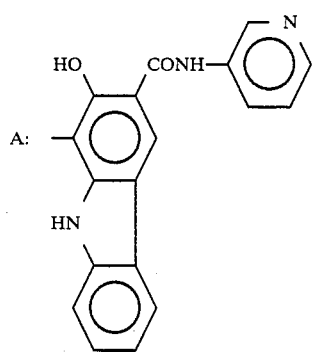
Exemplary pigment (30)
A: 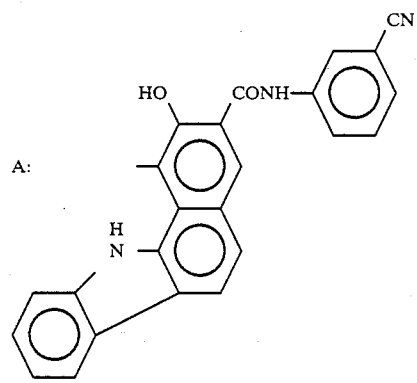
Exemplary pigment (31)
A: 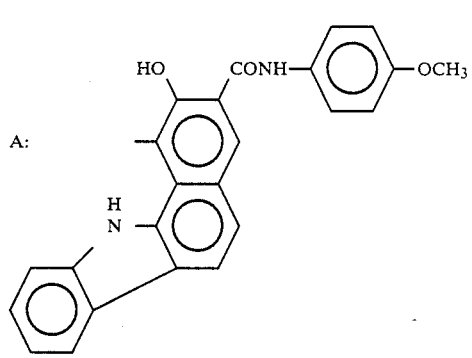
Exemplary pigment (32)
-continued
A: 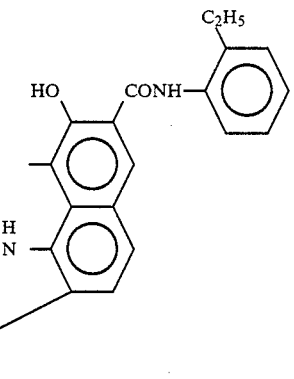
Exemplary pigment (33)
A: 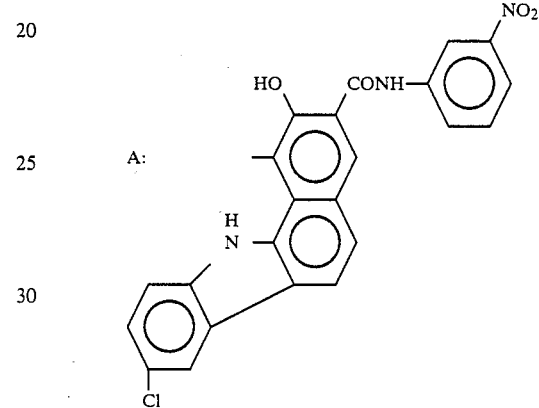
Exemplary pigment (34)
A: 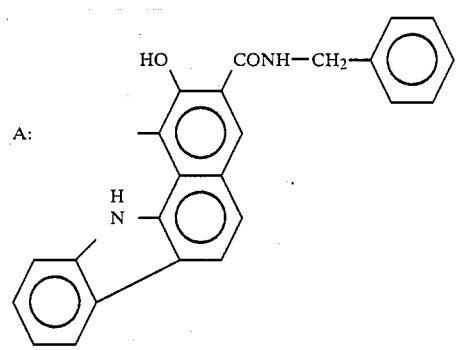
Exemplary pigment (35)
A: 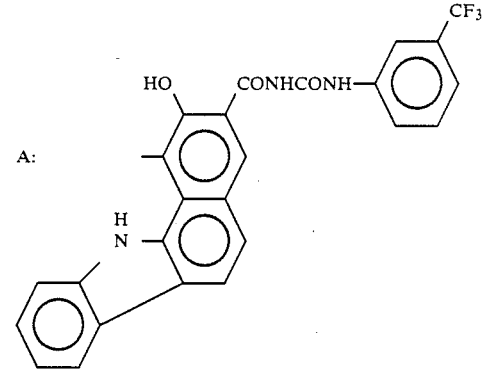
Exemplary pigment (36)

-continued
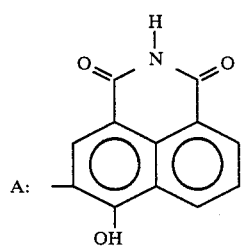
Exemplary pigment (37)
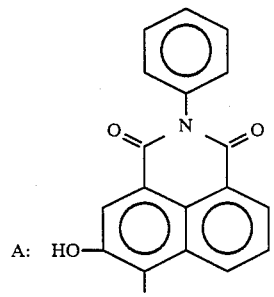
Exemplary pigment (38)
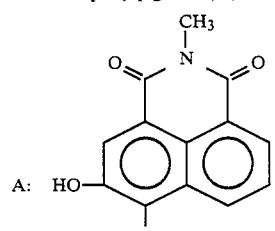
Exemplary pigment (39)
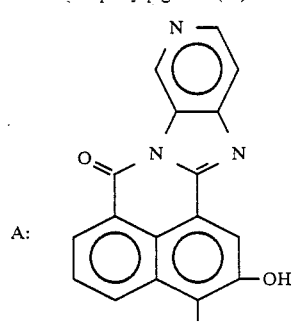
Exemplary pigment (40)
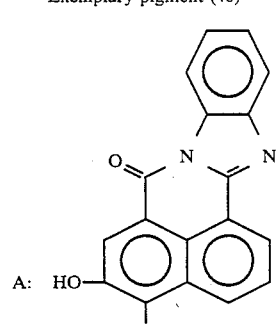
Exemplary pigment (41)
-continued
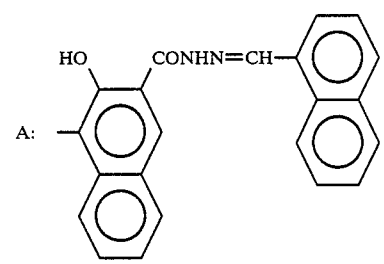
Exemplary pigment (42)
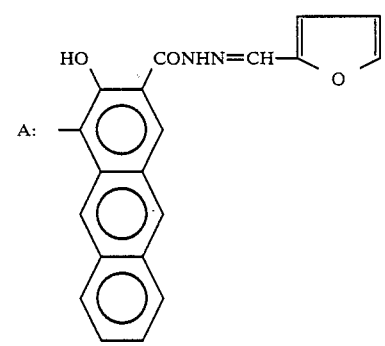
Exemplary pigment (43)
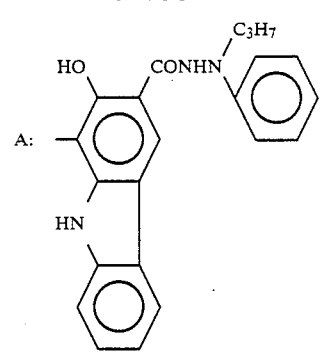
Exemplary pigment (44)
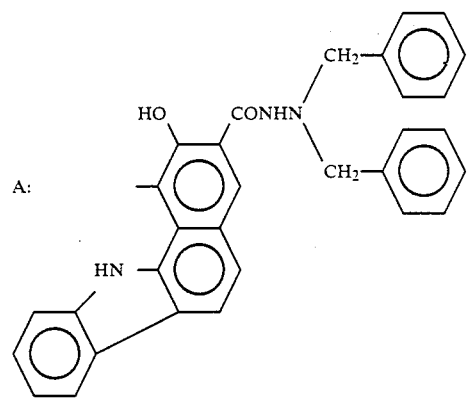
Exemplary pigment (45)

-continued

A: 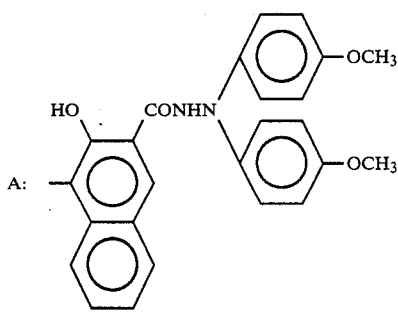

The trisazo pigment represented by the above formula (1) can be synthesized by hexazotizing a corresponding triamine according to the method as described in Hodgson Whitehurst, J. C. S., 1947, 80-1, isolating the product as borofluoride salt, and then coupling it with a corresponding coupler in a solvent such as N,N-dimethylformamide, dimethyl sulfoxide, etc. in the presence of a base such as sodium acetate, pyridine, triethylamine, triethanoamine, etc.

Synthesis example (Synthesis of the exemplary pigment (13))

2,6-Bz1-triaminobenzanthrone:

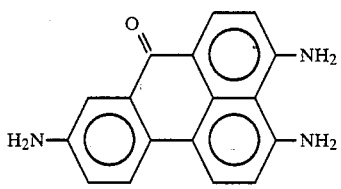

was dissolved in acetic acid following the above literature, and the solution was added dropwise into nitrosylsulfuric acid to be hexazotized, and the product was isolated as borofluoride.

Next, 500 ml of DMF was charged into one liter beaker, and 20.3 g (0.033 mol) of a coupler:

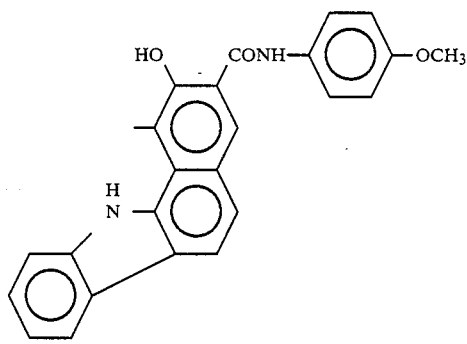

was dissolved therein, and after the solution was cooled to a temperature of 5° C., 10.0 g (0.017 mol) of the borofluoride previously obtained, followed by dropwise addition of 6.5 g (0.064 mol) of triethylamine over 5 minutes. After stirring for 2 hours, the product was recovered by filtration, washed with DMF, and washed with water, followed by lyophilization.

Yield 20.3 g. (82%), m.p. 300° C. or higher (decompd.).

| Elemental analysis: | Calcd. (%) | Found (%) |
|---|---|---|
| C | 73.45 | 73.48 |
| H | 4.02 | 4.10 |
| N | 11.55 | 11.59 |

The coating having the trisazo pigment as described above exhibits photoconductivity, and therefore can be used for the photosensitive layer of the electrophotographic photosensitive member as described below.

That is, in a specific example of the present invention, an electrophotographic photosensitive member can be prepared by forming a coating of the trisazo pigment as described above as a dispersion in an appropriate binder on an electroconductive support.

In a preferable example of the present invention, for the charge generation layer in the electrophotographic photosensitive member in which the photosensitive member of the electrophotographic is separated in function into the charge generation layer and the charge transport layer, the photoconductive coating as described above can be applied.

The charge generation layer, for obtaining sufficient absorbance, should preferably contain as much as possible the trisazo pigment exhibiting photoconductivity as described above and, also, for making the flight distance of the charge carriers generaed short, should be made a thin film layer having a film thickness of, for example, 5 $\mu$m or less, preferably 0.01 $\mu$m to 1 $\mu$m.

The charge generation layer can be formed by dispersing the above trisazo pigment in an appropriate binder and coating the dispersion on an electroconductive support, and the usable binder can be selected from a wide scope of insulating resins, and also from organic photoconductive polymers such as poly-N-vinylcarbazole, polyvinylanthracene or polyvinylpyrene.

Preferably, there may be employed insulating resins such as polyvinyl butyral, polyarylate (polycondensate of bisphenol A and phthalic acid, etc.), polycarbonate, polyester, phenoxy resin, polyvinyl acetate, acrylic resin, polyacrylamide, polyamide, polyvinylpyridine, cellulosic resin, polyurethane, epoxy resin, casein, polyvinyl alcohol, polyvinyl pyrrolidone, etc.

The resin to be contained in the charge generation layer may be 80% by weight or less, preferably 40% by weight or less.

The solvent for dissolving these resins differs depending on the kind of the resin, and should preferably be selected from those which do not dissolve the charge transport layer and the subbing layer as described below.

Specific examples of the organic solvent which can be used may include alcohols such as methanol, ethanol, isopropanol, etc.; ketones such as acetone, methyl ethyl ketone, cyclohexanone, etc.; amides such as N,N-dimethylformamide, N,N-dimethylacetamide, etc.; sulfoxides such as dimethyl sulfoxide, etc.; ethers such as tetrahydrofuran, dioxane, ethylene glycol monomethyl ether, etc.; esters such as methyl acetate, ethyl acetate, etc.; aliphatic halogenated hydrocarbons such as chloroform, methylene chloride, dichloroethylene, carbon tetrachloride, trichloroethylene, etc.; aromatic hydrocarbons such as benzene, toluene, xylene, ligroin, monochlorobenzene, dichlorobenzene, etc.

Coating can be performed by use of the coating method such as dip coating, spray coating, spinner coating, bead coating, Mayer bar coating, blade coating, roller coating, curtain coating, etc.

Drying should be preferably conducted according to the method in which heating drying is effected after finger touch drying at room temperature. Heating drying can be effected at a temperature of 30° to 200° C. for a time ranging from 5 minutes to 2 hours under stationary state or under air stream.

The charge transport layer is connected electrically to the charge generation layer as described above, and has the function of receiving the charge carriers injected from the charge generation layer in the presence of an electrical field, and also transporting these charge carriers to the surface. In this case, the charge transport layer may be laminated on the charge generation layer, or beneath thereof.

The charge transport substance includes the electron transportable substance and the positive hole transportable substance, and examples of the electron transportable substance may include electron attracting substances such as chloroanil, bromoanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone,2,4,5,-tetranitroxanthone, at 2,4,8-trinitrothioxanthone, etc., and these electron attracting substances formed into polymers.

Examples of the positive hole transportable substances may include pyrene, N-ethylcarbazole, N-isopropylcarbazole, N-methyl-N-phenylhydrazino-3-methylidene-9-ethylcarbazole, N,N-diphenylhydrazino-3-methylidene-9-ethylcarbazole; hydrazone type compounds such as p-diethylaminobenzaldehyde-N,N-diphenylhydrazone, p-diethylaminobenzaldehyde-N-α-naphthyl-N-phenylhydrazone, p-pyrrodinobenzaldehyde-N,N-diphenylhydrazone, 1,3,3-trimethylindolenine -ω-aldehyde-N,N-diphenylhydrazone, P-diethylbenzaldehyde-3methylbenzthiazolinone-2-hyrazone and the like; pyrazoline type compounds such as 2,5-bis(p-diethylaminophenyl)-1,3,4-oxadiazole, 1-phenyl-3-(p-diethylaminostyryl)-5-(p-diethylaminophenyl)-pyrazoline, 1-[quinolyl(2)]-3-(p-diethylaminostyryl)-5-(p-diethylaminophenyl)pyrazoline, spiropyrazoline and the like; styryl type compounds such as α-phenyl-4-N,N-diphenylaminostilbene, N-ethyl-3-(α-phenyl-styryl)carbazole, 9-dibenzylaminobenzylidene-9H-fluorenone, 5-p-ditoluylaminobenzylidene-5H-dibenzo[a,d]cycloheptene and the like; oxazole type compounds such as 2-(p-diethylaminostyryl) -6-diethylaminobenzoxazole, 2-(p-diethylaminophenyl)-4-(p-dimethylaminophenyl)-5-(2-chlorophenyl)oxazole and the like; thiazole type compounds such as 2-(p-diethylaminostyryl)-6-diethylaminobenzothiazole and the like; triarylmethane type compounds such as bis(4-diethylamino-2-methylphenyl)-phenylmethane and the like; polyarylalkanes such as 1,1-bis(4-N,N-diethylamino-2-methylphenyl)heptane, 1,1,2,2-tetrakis(4-N,N-dimethylamino-2-methylphenyl)ethane and the like; triphenylamine, poly-N-vinylcarbazole, polyvinylpyrene, polyvinylanthracene, polyvinylacridine, poly-9-vinylphenylanthracene, pyrene-formaldehyde resin, ethylcarbazole-formaldehyde resin, etc.

Other than these organic charge transport substances, inorganic materials such as selenium, selenium-tellurium, amorphous silicon, cadmium sulfide, etc. are also useful.

Also, these charge transport substances can be used either singly or as a combination of two or more kinds.

When the charge transport substance has no film forming property, the coating can be formed by selecting an appropriate binder. The resin which can be used as the binder may include, for example, insulating resins such as acrylic resin, polyarylate, polyester, polycarbonate, polystyrene, acrylonitrilestyrene copolymer, acrylonitrile-butadiene copolymer, polyvinyl butyral, polyvinyl formal, polysulfone, polyacrylamide, polyamide, chlorinated rubber, etc., or organic photoconductive polymers such as poly-N-vinylcarbazole, polyvinylanthracene, polyvinylpyrene, etc.

The charge transport layer is limited in transport of charge carriers, and therefore cannot be made to have a film thickness thicker than is necessary. Generally, the film thickness may be 5 $\mu$m to 35 $\mu$m, preferably in the range of from 10 $\mu$m to 25 $\mu$m. In forming the charge transport layer by coating, a suitable coating method as described above can be used.

The photosensitive layer comprising such laminated structure of charge generation layer and charge transport layer is provided on an electroconductive support. As the electroconductive support, a support having itself electroconductivity, for example, aluminum, aluminum alloy, copper, zinc, stainless steel, etc. may be employed.

Otherwise, a plastic having a layer of aluminum, aluminum alloy, indium oxide, tin oxide, indium oxide-tin oxide alloy, etc. formed by use of the vacuum vapor deposition method, a support having electroconductive particles (e.g. carbon black, silver particles, etc.) coated together with an appropriate binder on a plastic or the above electroconductive support, a support of a paper or plastic impregnated with electroconductive particles, a plastic having an electroconductive polymer, etc. can be used.

Between the electroconductive support and the photosensitive member, it is also possible to provide a subbing layer having the barrier function and the adhesion function.

The subbing layer can be formed of casein, polyvinyl alcohol, nitrocellulose, ethylene-acrylic acid copolymer, polyamide (nylon 6, nylon 66, nylon 610, copolymerized nylon, alkoxymethylated nylon, etc.), polyurethane, gelatin, aluminum oxide and others.

The thickness of the subbing layer may be 0.1 $\mu$m to 5 $\mu$m, preferably 0.5 $\mu$m to 3 $\mu$m.

According to another specific example of the present invention, a photosensitive coating can be formed, which contains the trisazo pigment shown by the above formula (1) as the sensitizer for organic photoconductive substances such as hydrazone type compounds, pyrazoline type compounds, styryl type compounds, oxazoles, thiazoles, triarylmethanes, polyarylalkanes, triphenylamines, poly-N-vinylcarbazoles, etc. or inorganic photoconductive substances such as zinc oxide, cadmium sulfide, selenium, etc. This photosensitive coating may be formed by coating the photoconductive substance and the trisazo pigment as mentioned above together with a binder.

Further, as another specific example of the present invention, an electrophotographic photosensitive member containing the trisazo pigment shown by the above formula (1) together with a charge transport substance in the same layer can be employed. In this case, other than the charge transport substance as described above, a charge transfer complex compound comprising poly-N-vinylcarbazole and trinitrofluorenone can be used.

The electrophotographic photosensitive member of this example can be prepared by dispersing the trisazo pigment and the charge transfer complex compound as described above in a polyester solution dissolved in tetrahydrofuran, followed by coating.

In any of the electrophotographic photosensitie members, the pigment used contains at least one pigment selected from the trisazo pigments represented by the formula (1), and its crystal form may be either amorphous or crystalline.

If necessary, for the purpose of enhancing the sensitivity of the photosensitivity, pigments with different light absorptions can be used in combination, or two or more kinds of the trisazo pigments shown by the formula (1) can be combined for the purpose of obtaining a panchromatic photosensitive member, and also it is possible to be used it in combination with a charge generation substance selected from known dyes and pigments.

The electrophotographic photosensitie member of the present invention can be utilized not only for electrophotographic copying machines, but also widely in the field of electrophotographic application such as laser beam printer, CRT printer, LED printer, liquid crystal printer, laser printing plate, etc.

EXAMPLES 1-19

On an aluminum plate was coated by use of Mayer bar a solution of 5 g of a methoxymethylated 6 nylon resin (number average molecular weight 32,000) and 10 g of an alcohol-soluble copolymer nylon resin (number average molecular weight 29,000) dissolved in 95 g of methanol to provide a subbing layer with a film thickness after drying of 1.0 μm.

Next, 5 g of the exemplary pigment (1) was added into a solution of 2 g of a butyral resin (butyral formation degree 63 mol %) dissolved in 95 ml of cyclohexanone, and dispersed in sand mill for 20 hours. The dispersion was coated by use of Mayer bar on the subbing layer previously formed to a film thickness after drying of 0.2 μ and dried to form a charge generation layer.

Subsequently, 5 g of a hydrazone compound of the structural formula:

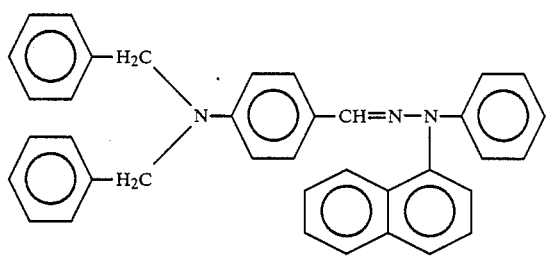

and 5 g of a polymethyl methacrylate (number average molecular weight 100,000) were dissolved in 40 ml of toluene, and the solution was coated by use of Mayer bar on the charge generation layer to a film thickness after drying of 20 μ and dried to form a charge transport layer, thus an electrophotographic photosensitive member of Example 1 was prepared.

Using other exemplary pigments in place of the exemplary pigment (1), photosensitive members corresponding to Examples 2 to 19 were prepared in entirely the same manner.

The charging characteristics of the thus prepared electrophotographic photosensitive members were examined use an electrostatic copying paper testing device (Model SP-428, manufactured by Kawaguchi Denki K. K.) by effecting corona charging according to the static system at $-5$ KV, holding in dark place for 1 sec. and then exposure at a luminance of 10 lux.

For the charging characteristics, the surface potential ($V_0$) and the exposure dosage ($E_{\frac{1}{2}}$) necessary for decaying the potential subjected to dark decay for one second to $\frac{1}{2}$ were measured. The results are shown below.

| Example | Exemplary Pigment | $V_0$ ($-V$) | $V_D$ ($-V$) | $E_{\frac{1}{2}}$ (lux.sec) |
|---|---|---|---|---|
| 1 | (1) | 710 | 700 | 2.5 |
| 2 | (2) | 700 | 680 | 2.0 |
| 3 | (3) | 705 | 690 | 1.6 |
| 4 | (4) | 700 | 685 | 2.2 |
| 5 | (8) | 700 | 690 | 2.1 |
| 6 | (9) | 710 | 705 | 1.8 |
| 7 | (10) | 710 | 700 | 2.3 |
| 8 | (11) | 715 | 700 | 1.8 |
| 9 | (13) | 700 | 685 | 1.3 |
| 10 | (14) | 700 | 710 | 1.5 |
| 11 | (15) | 700 | 705 | 1.9 |
| 12 | (16) | 710 | 700 | 2.6 |
| 13 | (17) | 720 | 700 | 2.8 |
| 14 | (30) | 705 | 690 | 2.0 |
| 15 | (31) | 700 | 680 | 1.3 |
| 16 | (32) | 710 | 680 | 1.5 |
| 17 | (33) | 705 | 685 | 1.8 |
| 18 | (35) | 700 | 695 | 1.4 |
| 19 | (45) | 705 | 685 | 2.4 |

Comparative examples

Except for using the azo pigments represented by the structural formulae shown below in place of the trisazo pigment of Example 9, photosensitive members corresponding to Comparative examples 1 and 2 were prepared in entirely the same manner as in Example 9, and the charging characteristics were similarly evaluated. The results are shown below.

(Comparative example 1)

Azo pigment

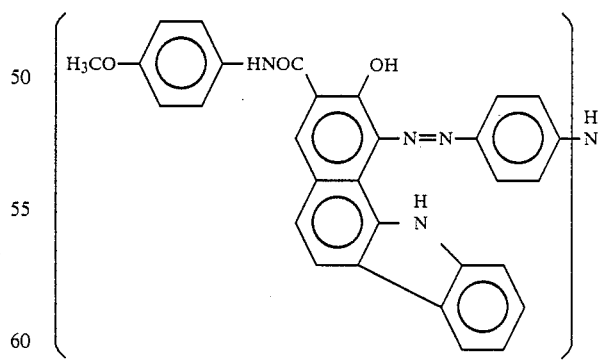

$V_o$: $-630$ V  $V_D$: $-530$ V
$E_{\frac{1}{2}}$: 1.5 lux · sec (Comparative example 2)

Azo pigment:

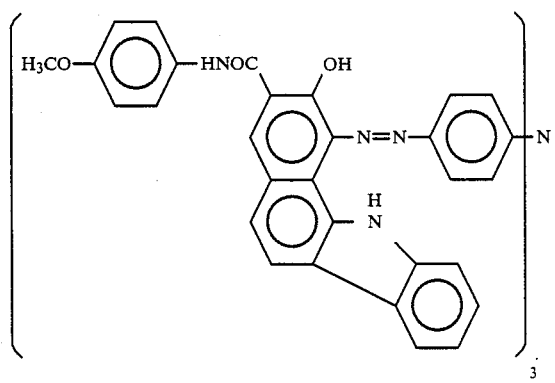

$V_o$: −640 V   $V_D$: −550 V
$E_{1/2}$: 1.2 lux · sec

From Example 9 and the above Comparative examples 1, 2, it can be understood that the electrophotographic photosensitive members by use of the trisazo pigment of the present invention have good charging ability and little dark decay.

EXAMPLES 20-25

The photosensitive members prepared in Examples 3, 9, 10, 13, 15, 17 were exposed with a semiconductor laser having an oscillation wavelength at 780 nm and the sensitivities at 780 nm were examined. Also, the sensitivity changes ΔE at 760 nm to 800 nm ($E_{1/2}$ (800 nm)/$E_{1/2}$ (760 nm)) were measured.

These results are shown below.

| Example | Photosensitive member (Example) | $E_{1/2}$ (μJ/cm$^2$) | ΔE |
|---|---|---|---|
| 20 | 3 | 1.8 | 0.91 |
| 21 | 9 | 1.0 | 0.86 |
| 22 | 10 | 1.4 | 0.84 |
| 23 | 13 | 1.9 | 0.90 |
| 24 | 15 | 1.2 | 0.95 |
| 25 | 17 | 1.3 | 0.86 |

Comparative example 3

Except for using a disazo pigment of the structural formula shown below as the charge generation substance:

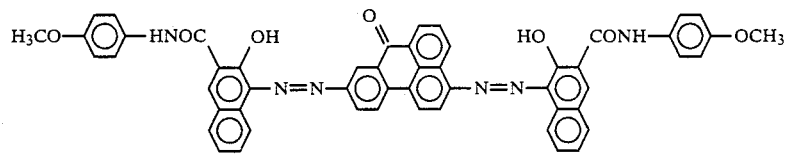

a photosensitive member was prepared in the same manner as in Example 3, and the sensitivity at 780 nm and the sensitivity change ΔE at 760 nm to 800 nm (=$E_{1/2}$ (800 nm)/$E_{1/2}$ (760 nm)) were measured similarly as described in Example 20. The results are shown below.

| Comparative example | $E_{1/2}$ (μJ/cm$^{-2}$) | ΔE |
|---|---|---|
| 3 | 2.0 | 0.55 |

From the above results, the electrophotographic photosensitive member by use of the trisazo pigment of the present invention has excellent sensitivity to high wavelength region. Further, the electrophotographic photosensitive member by use of the trisazo pigment of the present invention has little sensitivity change at 760 nm to 800 nm, thus having uniformly high long wavelength sensitivity.

EXAMPLES 26-31

Using the photosensitive members prepared in Examples 3, 9, 10, 13, 15, 17, the fluctuations in light portion potential and dark portion potential during repeated uses were measured.

For the method, the above photosensitive member was plastered onto the cylinder of an electrophotographic copying machine equipped with a corona charger of −5.6 KV, an exposure optical system, a developing instrument, a transfer charger, a deelectrifying exposure optical system and a cleaner. With driving of the cylinder of the copying machine, an image is obtained on the transfer paper. Using this copying machine, the initial light portion potential ($V_L$) and dark portion potential ($V_D$) were set at −200 V and −700 V, respectively, and the fluctuations $\Delta V_L$ and $\Delta V_D$ of the light portion potential ($V_L$) and the dark portion potential ($V_D$) after used 5,000 times were measured.

The results are shown below. The negative symbols in $\Delta V_D$ and $\Delta V_L$ indicate lowering in potential, and the positive signals elevation in potential.

| Example | Photosensitive member (Example) | $\Delta V_D$ (V) | $\Delta V_L$ (V) |
|---|---|---|---|
| 26 | 3 | −10 | +20 |
| 27 | 9 | −15 | +5 |
| 28 | 10 | −10 | +10 |
| 29 | 13 | −15 | +15 |
| 30 | 15 | −5 | +15 |
| 31 | 17 | −10 | +20 |

Comparative examples 4 and 5

The photosensitive members prepared in Comparative examples 1, 2 were subjected to measurement of the potential fluctuations during repeated used according to the same method as in Example 29. The results are shown below.

| Comparative example | Photosensitive member (Comparative example) | $\Delta V_D$ (V) | $\Delta V_L$ (V) |
|---|---|---|---|
| 4 | 1 | −150 | −50 |

| Comparative example | Photosensitive member (Comparative example) | $\Delta V_D (V)$ | $\Delta V_L (V)$ |
| --- | --- | --- | --- |
| 5 | 2 | −110 | −10 |

From the above results, it can be seen that the electrophotographic photosensitive member of the present invention is little in potential fluctuation during use.

EXAMPLE 32

On the aluminum surface of an aluminum vapor deposited polyethyleneterephthalate film was formed a coating of a polyvinyl alcohol with a thickness of 0.5 μm.

Next, the dispersion of the trisazo pigment used in Example 9 was coated by Mayer bar on the polyvinyl alcohol layer previously formed to a film thickness after drying of 0.2 μm, followed by drying, to form a charge generation layer.

Next, a solution of 5 g of a styryl compound represented by the following structural formula:

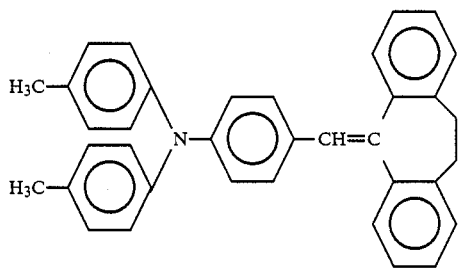

and 5 g of a polyarylate (a polycondensate of bisphenol A and terephthalic acid-isophthalic acid) dissolved in 40 ml of tetrahydrofuran was coated on the charge generation layer to a film thickness after drying of 18 μm, following by drying, to form a charge transport layer.

The charging characteristics and the durability characteristics of the electrophotographic photosensitive member thus prepared were measured according to the same method as described in Example 26. The results are shown below.

$V_0$: −695 V
$E1/2$: 1.1 lux.sec.
$\Delta V_D$: 0V
$\Delta V_L$: +10 V.

EXAMPLE 33

A photosensitive member having the charge transport layer and the charge generation layer of the photosensitive layer prepared in Example 11 coated in the opposite order was prepared, and the charging characterisics were evaluated as described in Example 1, provided the charging polarity was made +. The results are shown below.

$V_0$: +710 V
$E\frac{1}{2}$: 2.5 lux.sec.

EXAMPLE 34

On the charge generation layer prepared in Example 1, a coating solution prepared by dissolving 5 g of 2,4,7-trinitro-9-fluorenone and 5 g of a poly-4, 4-dioxydiphenyl-2,2-propane carbonate (molecular weight 300,000) in 70 ml of monochlorobenzene was coated by Mayer bar to a film thickness after drying for 12 g/m² and dried.

The electrophotographic photosensitive member thus prepared was subjected to measurement of charging characteristics according to the same method as in Example 1, provided the charging polarity was made +. The results are shown below.

$V_0$: +690 V
$E\frac{1}{2}$: 5. lux.sec.

EXAMPLE 35

On an aluminum plate with a thickness of 100 μm was coated an aqueous ammonia solution of casein and dried to form a subbing layer with a film thickness of 0.5 μm.

Next, 5 g of 2,4,7-trinitro-9-fluorenone and 5 g of a poly-N-vinylcarbazole (number average molecular weight 300,000) were dissolved in 70 ml of tetrahydrofuran to prepare a charge transfer complex compound. The charge transfer complex compound and 1 g of the exemplary compound (2) were dispersed by adding into a solution of 5 g of a polyester (trade name: Vylon, manufactured by Toyobo) dissolved in 70 ml of tetrahydrofuran. The dispersion was coated on the subbing layer and dried to form a photosensitive layer of 15 μm.

The charging characteristics of the thus prepared electrophotographic photosensitive member were measured according to the same method as in Example 1, provided the charging polarity was made +. The results are shown below.

$V_0$: +660 V
$E\frac{1}{2}$: 4.8 lux.sec.

I claim:

1. An electrophotographic photosensitive member having a photosensitive layer on an electroconductive support, wherein said photosensitive layer contains a trisazo pigment represented by the formula (1) shown below:

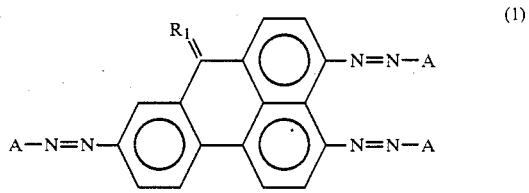

(1)

wherein $R_1$ represents oxygen atom or

and A represents a coupler residue having phenolic hydroxyl group.

2. An electrophotographic photosensitive member according to claim 1, wherein A is a residue represented by the formula (2) shown below:

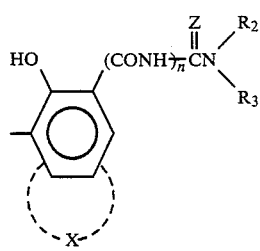

(2)

wherein X represents a residue necessary for forming a polycyclic aromatic ring or a hetero ring by fusion with benzene ring; $R_2$ and $R_3$ each represent hydrogen atom, an alkyl, aryl, aralkyl, heterocyclic group which may have substituent or a cyclic amino group containing the nitrogen atom to which $R_2$ and $R_3$ are bonded within the ring; Z represents oxygen atom or sulfur atom; n represents an integer of 0 or 1.

3. An electrophotographic photosensitive member according to claim 1, wherein A is a residue represented by the formula (3) shown below:

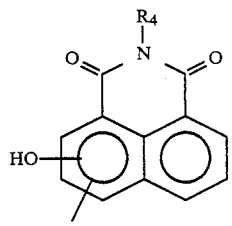

(3)

wherein $R_4$ represents hydrogen atom, an alkyl, aryl or aralkyl group which may have substituent.

4. An electrophotographic photosensitive member according to claim 1, wherein A is a residue represented by the formula (4) shown below:

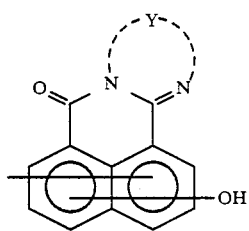

(4)

wherein Y represents a divalent group of an aromatic hydrocarbon or a divalent group of a heterocyclic ring containing nitrogen atom within the ring.

5. An electrophotographic photosensitive member according to claim 1, wherein A is a residue represented by the formula (5) shown below:

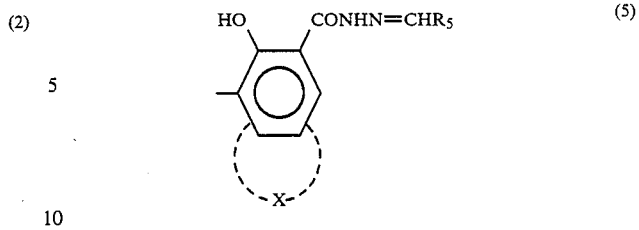

(5)

wherein $R_5$ represents an aryl or heterocyclic group which may have substituent; and X represents a residue necessary for formation of polycyclic aromatic ring or heterocyclic ring by fusion with benzene ring.

6. An electrophotographic photosensitive member according to claim 1, wherein A is a residue represented by the formula (6) shown below:

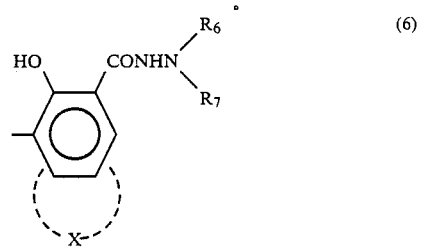

(6)

wherein $R_6$ and $R_7$ each represent an alkyl, aralkyl, aryl or heterocyclic group which may have substituent; and X represents a residue necessary for formation of polycyclic aromatic ring or heterocyclic ring by fusion with benzene ring.

7. An electrophotographic photosensitive member according to any of claims 2, 5 and 6, wherein the ring to which X is bonded in the formula is naphthalene ring, anthracene ring, carbazole ring or benzcarbazole ring.

8. An electrophotographic photosensitive member according to claim 1, wherein the photosensitive layer contains a charge transport substance.

9. An electrophotographic photosensitive member according to claim 8, wherein the photosensitive layer has a laminated structure of a charge generation layer and a charge transport layer.

10. An electrophotographic photosensitive member according to claim 9, wherein the trisazo pigment represented by the formula (1) is contained in the charge generation layer.

11. An electrophotographic photosensitive member according to claim 9, wherein the charge transport layer is provided on the charge generation layer.

12. An electrophotographic photosensitive member according to claim 1, wherein a subbing layer is provided between the electroconductive support and the photosensitive layer.

13. An electrophotographic photosensitive member according to claim 8, wherein the charge transport substance is a hydrazone compound or a styryl compound.

* * * * *